(12) United States Patent
Oliver

(10) Patent No.: US 9,677,590 B2
(45) Date of Patent: Jun. 13, 2017

(54) ROTATING TENSION LATCH

(71) Applicant: Javier E. Oliver, Plano, TX (US)

(72) Inventor: Javier E. Oliver, Plano, TX (US)

( * ) Notice: Subject to any disclaimer, the term of this patent is extended or adjusted under 35 U.S.C. 154(b) by 680 days.

(21) Appl. No.: 13/652,976

(22) Filed: Oct. 16, 2012

(65) Prior Publication Data

US 2014/0105679 A1    Apr. 17, 2014

(51) Int. Cl.
*F16B 7/20* (2006.01)
*F16B 21/04* (2006.01)

(52) U.S. Cl.
CPC ......... *F16B 21/04* (2013.01); *Y10T 403/7005* (2015.01)

(58) Field of Classification Search
CPC .... F16B 5/10; F16B 7/20; F16B 21/02; F16B 21/04; F16B 21/09; Y10T 403/7005; Y10T 403/7007
See application file for complete search history.

(56) References Cited

U.S. PATENT DOCUMENTS

| | | | |
|---|---|---|---|
| 2,799,344 A * | 7/1957 | Muse | 166/123 |
| 3,072,430 A * | 1/1963 | Fahrenwald | C21D 9/0018 285/18 |
| 3,211,479 A * | 10/1965 | Brown | 285/360 |
| 4,483,563 A * | 11/1984 | van der Heyden | 294/90 |
| 5,466,020 A * | 11/1995 | Page et al. | 285/361 |
| 6,877,778 B2 * | 4/2005 | Froment et al. | 285/361 |
| 8,057,121 B2 * | 11/2011 | Gallagher | 403/318 |
| 2006/0189961 A1 | 8/2006 | Miyahara | |

FOREIGN PATENT DOCUMENTS

| | | | | |
|---|---|---|---|---|
| DE | 199 22 618 | * | 12/2000 | ............... F16B 1/02 |
| EP | 0636215 B1 | | 9/2002 | |
| WO | WO 2006/021561 | * | 3/2006 | ............. B26B 25/00 |

* cited by examiner

*Primary Examiner* — Michael P Ferguson

(57) ABSTRACT

A female latch member comprising an aperture having a central axis and an inside surface, and first and second portions extending radially from said inside surface. The first and second portions cooperate to form a channel, wherein the channel is configured to receive a pin of a male latch member and cause the female latch member to rotate relative to the male latch member, while the female latch member and the male latch member alternate between latched and unlatched configurations as the female latch member reciprocates along the central axis relative to the male latch member. The female latch member and the male latch member temporarily engage one another when latched.

22 Claims, 6 Drawing Sheets

ROTATING TENSION LATCH

TECHNICAL FIELD

This application is directed, in general, to a coupling device or latch and, more specifically, to a rotating tension latch.

BACKGROUND

Fasteners are ubiquitous. A quick trip to the hardware section of any home center will readily reveal the broad selection of fasteners. Screws, bolts, rivets, wall anchors, cotter pins, magnets, latches, etc., serve to enable one object to be fastened permanently or temporarily to another object. Seemingly, the choices are so broad that there is likely a specific fastener for every specific application.

Many assembly line operations use fasteners, such as bolts or screws, to couple two separate parts together. However, in many automated assembly line operations it is desirable to grasp an assembly with a robotic arm and temporarily relocate the assembly to the next station where assembly continues. In some applications magnetic or vacuum forces are employed to grasp the assembly for transport. However, in some applications magnetic forces may be undesirable because of the nature of the assembly which may be adversely affected by magnetism. Similarly, other assemblies may be unsuitable for the use of vacuum force because of insufficient area to affect a secure grasp of the assembly, excessive weight of the workpiece, etc. Therefore, there is needed a simple and re-useable mechanical fastener that may be employed in these and other suitable applications.

SUMMARY

One aspect provides a female latch member comprising an aperture having a central axis and an inside surface, and first and second portions extending radially from said inside surface. The first and second portions cooperate to form a channel, wherein the channel is configured to receive a pin of a male latch member and cause the female latch member to rotate relative to the male latch member while the female latch member and the male latch member alternate between latched and unlatched configurations as the female latch member reciprocates along the central axis relative to the male latch member. The female latch member and the male latch member intermittently engage one another when latched.

Another aspect provides a male latch member comprising a core having a central axis and an outside surface, and first and second portions radially extending from the core that cooperate to form a channel around the core. The channel is configured to receive a pin of a female latch member and cause the male latch member to rotate relative to the female latch member. The channel is further configured to alternate between latched and unlatched configurations as the male latch member reciprocates along the central axis relative to the female latch member. The male latch member and the female latch member temporarily engage one another when latched.

Another aspect provides a pick and place system comprising a first latch member having a central axis and a surface around the central axis, a second latch member, and first and second portions extending radially from the surface. The first and second portions cooperate to form a channel, wherein the channel is configured to receive a pin of the second latch member and cause the first latch member to rotate relative to the second latch member. Consequently, the first and second latch members alternate between latched and unlatched configurations as the first latch member reciprocates along the central axis relative to the second latch member. The first latch member and the second latch member intermittently engage one another when latched.

BRIEF DESCRIPTION

Reference is now made to the following descriptions taken in conjunction with the accompanying drawings, in which.

DETAILED DESCRIPTION

Figure 1:
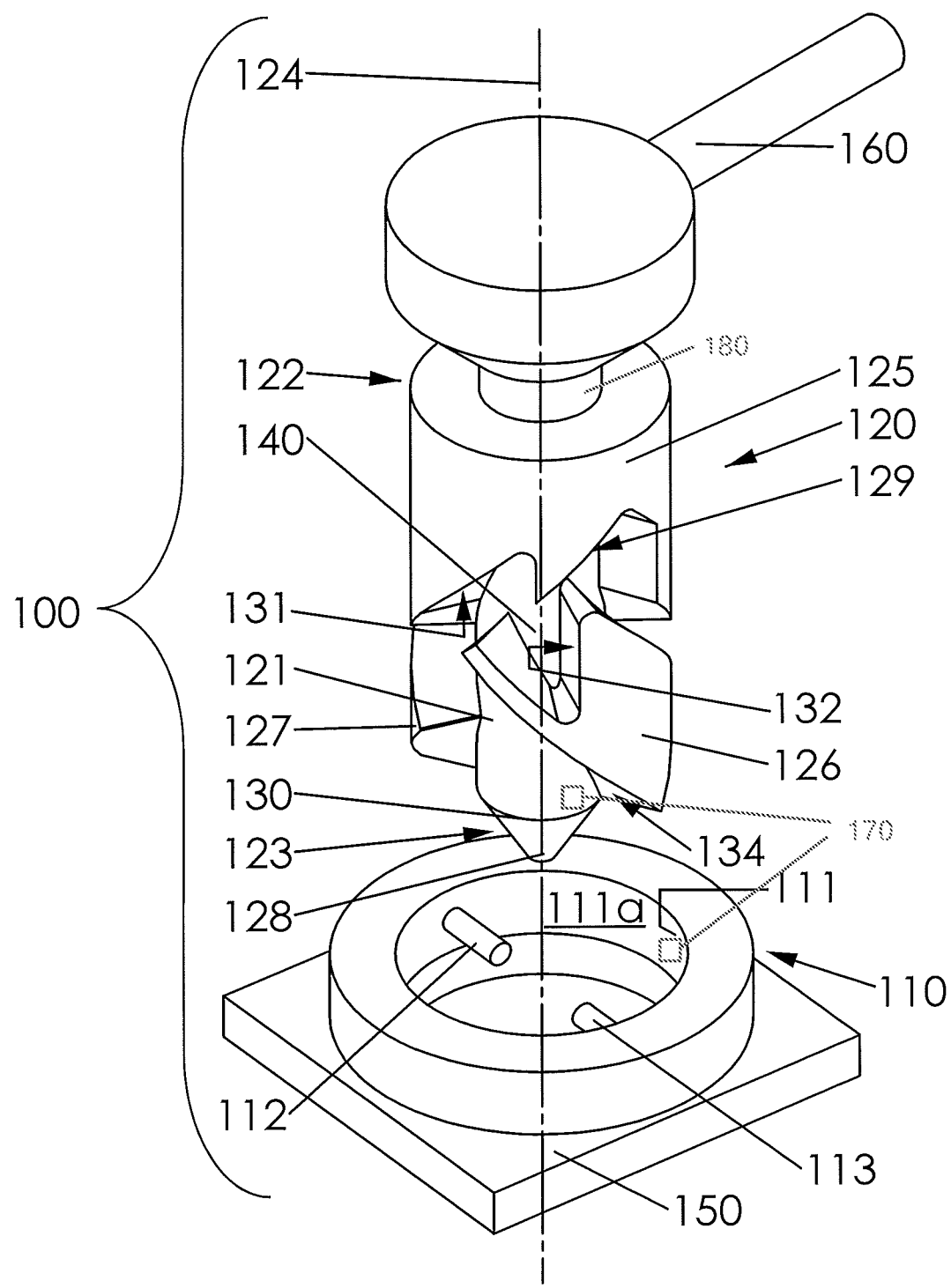
FIG. 1 is an exploded isometric view of one embodiment of a rotating tension latch constructed according to the principles of the present disclosure.

Referring initially to FIG. 1, illustrated is an exploded isometric view of one embodiment of a rotating tension latch 100 constructed according to the principles of the present disclosure. For the purposes of this discussion, the operating principles of a rotating tension latch 100 will be explained with respect to a female latch member 110 and a male latch member 120. The female latch member 110 includes a central aperture 111 having an inner surface 111a and first and second pins 112, 113, respectively. In the illustrated embodiment, the first and second pins 112, 113, respectively, extend radially inward from the inner surface 111a into the central aperture 111 and are diametrically opposed. For balance, and to limit rotation between unlocked and tension locked positions, the present embodiment includes both first and second pins 112, 113, respectively, spaced apart by 180° around the inner surface 111a of the female latch member 110. In an alternative embodiment, the female latch member 110 may include only a single pin, for example the first pin 112. In yet another embodiment, the female latch member 110 may include three or more pins. In such embodiments, it is advantageous that the pins be distributed evenly around the inner surface 111a; for example, three pins are evenly distributed with 120° between adjacent pins; four pins are evenly distributed with 90° between adjacent pins, etc.

The male latch member 120, in one embodiment, includes a core 121 having a first end 122; a second end 123; a central axis 124; first, second and third portions 125-127, respectively; and a cone 128. The cone 128 may be truncated as shown. The core 121, in this embodiment, is substantially-cylindrical around the central axis 124 and comes to a blunt point or a truncated cone 128. Such a truncated cone 128 form may also be referred to as chamfered. The first, second and third portions 125-127, respectively, are solid masses contiguous to the core 121 that limit the vertical travel of the first pin 112 when the male latch member 120 is inserted into the female latch member 110. Note that the initial angular (rotated) relationship of the female latch member 110 (and therefore also the first and second pins 112, 113, respectively) to the male latch member 120 is unimportant, as the male latch member 120 and the female latch member 110 will self-align with the aid of the chamfered/truncated cone 128.

For the purposes of this disclosure, vertical movement is defined as along the central axis 124 of the male latch member 120. Of course, one of skill in the pertinent art will recognize that this "defined vertical" may vary from "absolute local vertical" of the location wherein the tension latch 100 is employed.

In this embodiment, the first portion 125 is proximate the first end 122 and extends radially outward from the core 121. The first portion 125 has a first irregular surface 131 proximate a midpoint 140 of the core 121. The first irregular surface 131, in the illustrated embodiment, is perpendicular to the central axis 124 and has an edge 129 that is sawtooth-like. The first irregular surface 131 defines a vertical limit as a bearing surface that the first pin 112 may travel along the core 121 while the male latch member 120 is inserted into the female latch member 110. The first portion 125 is continuous around the core 121 so that the first and second pins 112, 113 may not pass vertically beyond the first irregular surface 131.

The second portion 126 is proximate the second end 123 and extends radially outward from the core 121. The second portion 126 has a second irregular surface 132 proximate the midpoint 140 that, in this embodiment, is also perpendicular to the central axis 124. The first and second irregular surfaces 131, 132, respectively, form an irregular channel 133 therebetween that is configured to guide one of the first and second pins 112, 113, respectively, around at least a portion of a periphery 130 of the core 121. The channel 133 is "irregular" in that the width of the channel 133 between the first and second irregular surfaces 131, 132, respectively, varies with the location around the periphery of the core 121. The second portion 126 also has a third irregular surface 134 proximate the second end 123. The third portion 127, in this embodiment, is similar to, and positioned 180° around the core 121 from, the second portion 127. The third portion 127 together with the first portion 125 forms a second channel (not visible) that is substantially identical to the first channel 133. The second and third portions 126, 127, respectively, are evenly distributed around the core 121, and therefore the first channel 133 and the second channel are evenly distributed around the core 121. Similarly, the first and second pins are evenly distributed around the inner surface 111a of the female latch member 110.

In one embodiment, the female latch member 110 may be fixed to or part of a workpiece 150 and the male latch member 120 may be rotatably coupled around the central axis 124 to a positioning arm 160. The motion of the positioning arm 160 may be controlled by an automated machine (not shown). One of skill in the pertinent art is familiar with conventional methods to rotationally couple the male latch member 120 to the positioning arm 160 and how an automated machine may be made to place the male latch member 120 in a desired position relative to the female latch member 110.

For ease of illustration and understanding of the principles of the present device, the female latch member 110 will be considered fixedly coupled to a workpiece 150 and the male latch member 120 will be moveable vertically with respect to the female latch member 110 as well as capable of rotation with respect to the female latch member 110. This vertical movement along the central axis 124 may be referred to as "reciprocation" as the rotating tension latch operates first in a downward motion and then an upward motion followed by a second downward motion. This combination of linear motions together with rotation of the male latch member 120 causes the tension latch 100 to move from unlatched, to a momentarily latched, to an unlatched condition. Of course, momentarily does not mean only for a very limited time, as the rotating tension latch 100 will maintain the latched condition so long as tension remains between the male and female latch members 120, 110, respectively.

Referring now to FIG. 2A-2M, illustrated is a series of elevation views of the periphery of the male latch member 120 and a sectional view of the female latch member 110. That is, the side surfaces (periphery) of the male latch member 120 show the first, second, and third portions 125, 126, 127, respectively, flattened out to form a planar view of the outer surface of the male latch member 120. This provides a more easily understood view showing the progress of the interaction of the first and second pins 112, 113, respectively, with the contours of the male latch member 120. In the series of elevation views, FIG. 2A-2M, the female latch member 110 will be shown in a fixed vertical location until the tension latch 100 engages in FIG. 2G and the position of the male latch member 120 will be positioned vertically relative to the female latch member 110 as befits the interaction of the male and female latch members, 120, 110, respectively, in FIG. 2H. This demonstrates how the tension latch 100 may be used to move a workpiece having a female latch member embedded or applied thereto. Only the first pin 112 will be shown in subsequent FIGURES for simplicity. One of skill in the pertinent art will recognize that the second pin 113 interacts with the third portion 127 in the same manner as the first pin 112 interacts with the second portion 126. One of skill in the pertinent art will further recognize the sawtooth-like profile of the first irregular surface 131 (having an edge 129) which has alternating short and long teeth 231, 232 respectively, as shown in FIG. 2A.

Figure 2A:
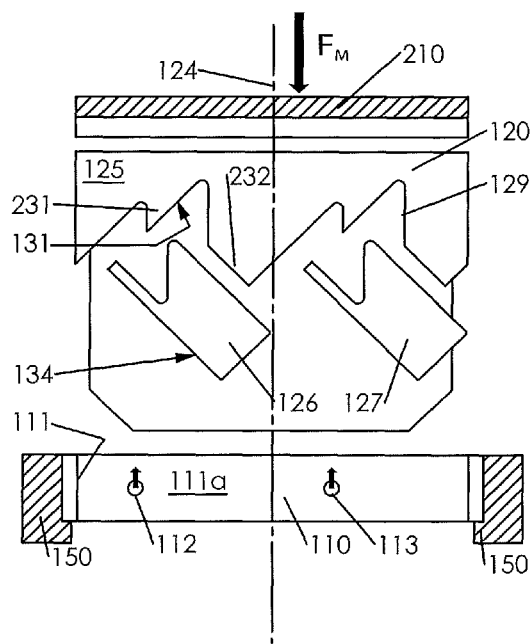
FIG. 2A-2M are a series of elevation views of a periphery of a male latch member and sectional views of a corresponding female latch member in a progression from unlocked to locked in tension to unlocked.

Continuing now with FIG. 2A with continuing reference to FIG. 1, an attachment 210 of the positioning arm 160 (not shown in these views) places the male latch member 120 vertically proximate the female latch member 110. The first pin 112 is randomly positioned with respect to the workpiece 150 and the male latch member 120, as would be the case in a manufacturing production line. In these figures, the first pin 112 is represented by its cross section as a small circle. The central axis 124 is approximately aligned with a center of the central aperture 111 (FIG. 1). The male latch member 120 is aligned with, but not in contact with, the female latch member 110 at this point. The female latch member 110 is fixed with respect to the workpiece 150 in this example. A vertical downward force $F_M$ is applied to the male latch member 120. In one embodiment, this downward force $F_M$ may be applied by the positioning arm 160 (not shown) through the attachment 210. In this embodiment, the male latch member 120 is free to rotate as necessary around the central axis 124 even as the downward force $F_M$ is applied.

In an alternative embodiment, the male latch member 120 may be positioned by a flexible attachment 120 such as a cable (not shown). In that embodiment, gravity acting on the male latch member 120 may be used as a force to latch and unlatch the male latch member 120 to the female latch member 110. Of course, one who is of skill in the art will realize that tool tolerances for a gravity-operated device must be carefully considered for reliable operation.

Figure 2B:
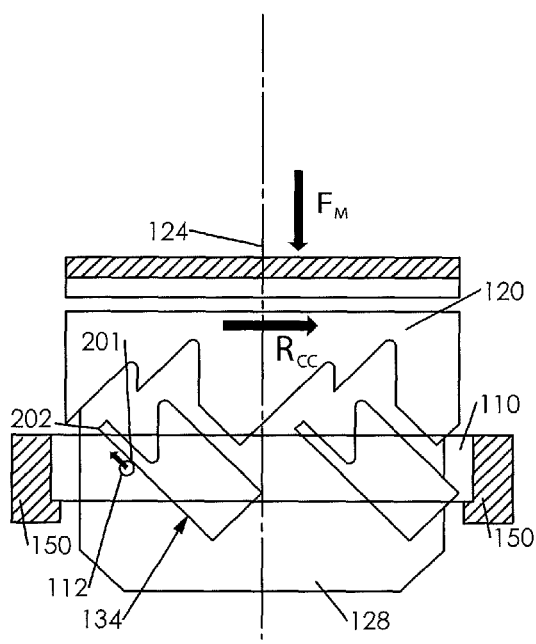

FIG. 2B shows the male latch member 120 advanced vertically downward toward the central aperture 111 with the chamfered end or truncated cone 128 assisting in correcting for non-alignment of the central aperture 111 and the central axis 124. In the illustrated embodiment, the first pin 112 contacts a point 201 on the third irregular surface 134 and the male latch member 120 rotates counter-clockwise $R_{cc}$ (when viewed from above) or left to right as in FIG. 2B as the male latch member 120 advances downward toward the female latch member 110. As the male latch member 120 further advances toward the female latch member 110 and rotates, the first pin 112 moves toward a point 202 on the third irregular surface 134.

Figure 2C:
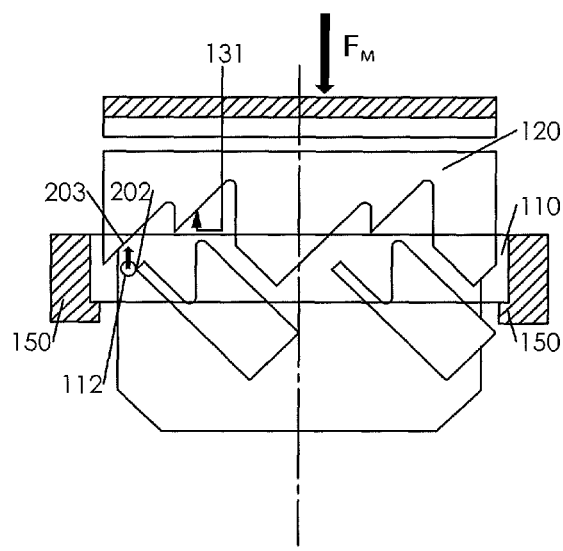

FIG. 2C shows the male latch member 120 rotated and advanced so that the first pin 112 is at the point 202 on the third irregular surface 134. The male latch member 120 continues to advance toward the female latch member 110, but ceases rotation for a moment, as the first pin 112 moves toward a point 203 on the first irregular surface 131.

Figure 2D:
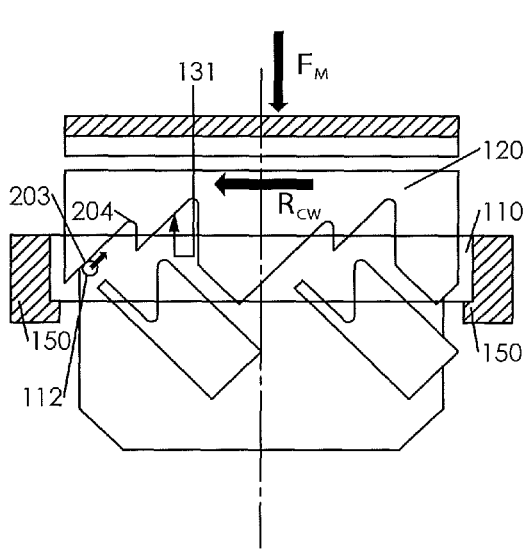

FIG. 2D shows the male latch member 120 advanced so that the first pin 112 is at the point 203 on the first irregular surface 131. The male latch member 120 continues to advance toward the female latch member 110, but now rotates clockwise $R_{cw}$ from above (right to left in the FIG.), and the first pin 112 moves toward a point 204 on the first irregular surface 131.

Figure 2E:
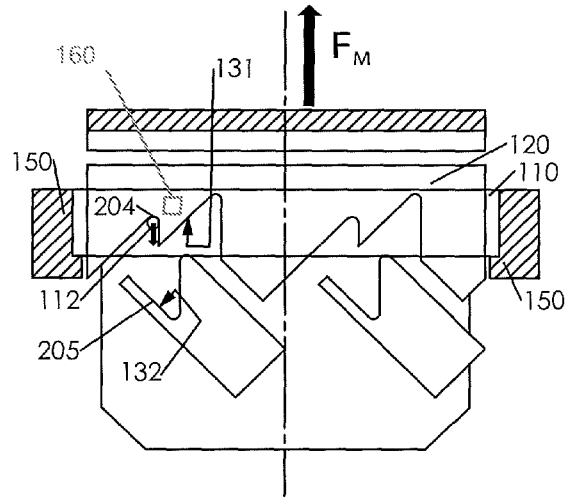

FIG. 2E shows the male latch member 120 advanced so that the first pin 112 is at the point 204 on the first irregular surface 131. The male latch member 120 is at its farthest advance toward the female latch member 110 until the two members lock in tension. The male latch member 110 force $F_M$ now reverses to an upward vertical force so that the male latch member 120 moves upward relative to the female latch member 110 and the first pin 112 moves toward a point 205 on the second irregular surface 132.

Figure 2F:
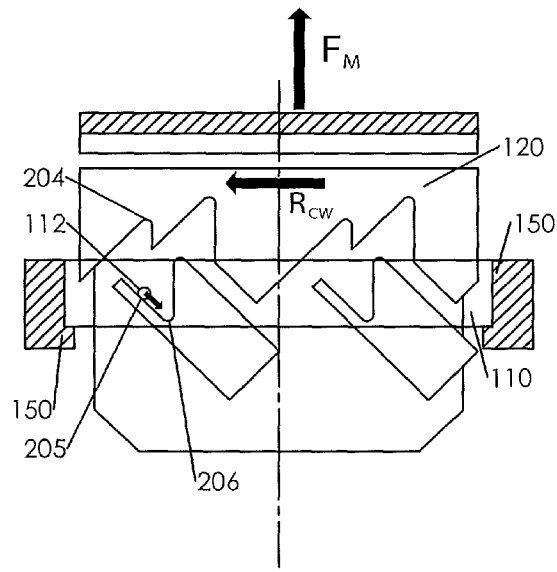

FIG. 2F shows the male latch member 120 withdrawn so that the first pin 112 is at the point 205 on the second irregular surface 132. The male latch member 120 continues to withdraw from the female latch member 110, but now rotates clockwise $R_{cw}$ from above (right to left in the FIG.), and the first pin 112 moves toward a point 206 on the second irregular surface 132.

Figure 2G:
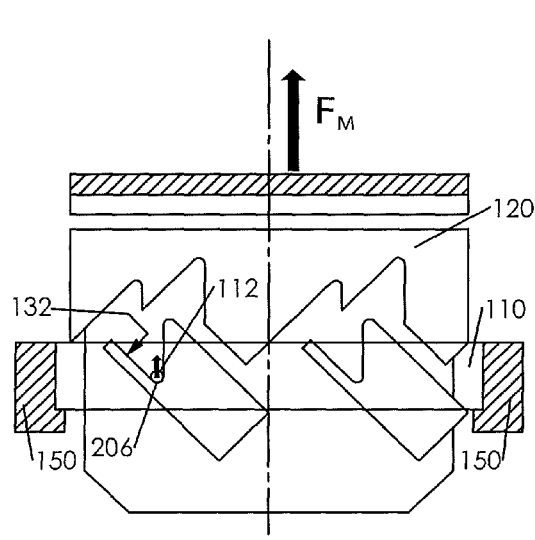

FIG. 2G shows the male latch member 120 withdrawn so that the first pin 112 is captured at the point 206 on the second irregular surface 132. Point 206 includes a concavity configured to capture the first pin 112 in tension between the female latch member 110 and the male latch member 120. The male latch member 120 and the female latch member 110 are now locked in tension and will move vertically, or alternatively horizontally, as a single unit so long as there is continuous upward force $F_M$. The latched condition may be termed temporary because the rotating tension latch 100 is intended for the limited amount of time necessary to reposition the workpiece.

Figure 2H:
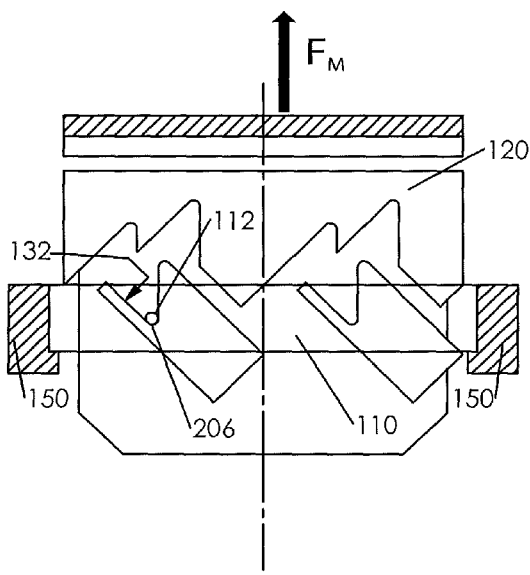

FIG. 2H shows the male latch member 120 withdrawn vertically with the female latch member 110 coupled thereto as well as workpiece 150. The first pin 112 remains captured in tension at point 206. Therefore, workpiece 150 can be relocated as necessary to the next station on the assembly line.

Figure 2I:
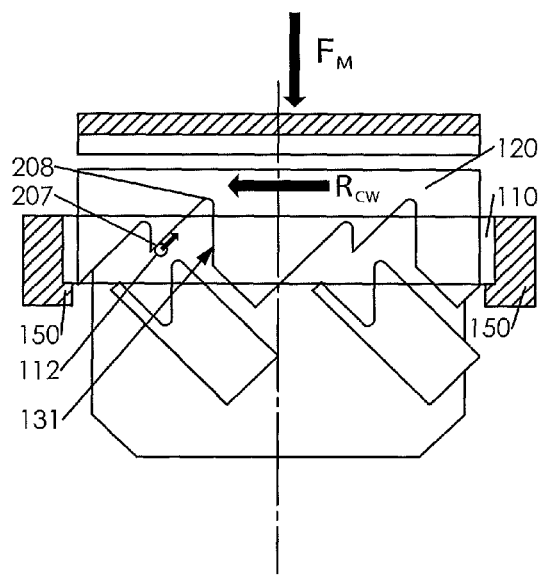

FIG. 2I shows the male latch member 120 located so that the workpiece 150 is at the next station of the assembly line. The workpiece 150, female latch member 110 and male latch member 120 are lowered until the workpiece 150 is in position. At that time, the female latch member 110 and the workpiece resist further movement, and a downward vertical force $F_M$ may be applied to the male latch member 120 releasing tension on the first pin 112. This force $F_M$ causes vertical motion of the male latch member 120 relative to the female latch member 110 and places the first pin 112 at a point 207 on the first irregular surface 131. Continued downward force $F_M$ causes clockwise rotation $R_{CW}$ of the male latch member 120 and movement of the first pin 112 toward a point 208 on the first irregular surface 131. This, in one embodiment, unlocks the male latch member 120 from the female latch member 110.

Figure 2J:
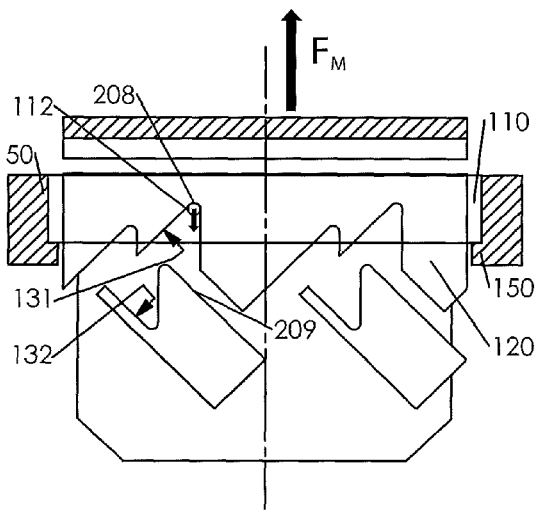

FIG. 2J shows the male latch member 120 advanced so that the first pin 112 is at the point 208 on the first irregular surface 131. Reversing the vertical force $F_M$ causes the male latch member 120 to move vertically relative to the female latch member 110 and the first pin 112 moves toward a point 209 on the second irregular surface 132.

Figure 2K:
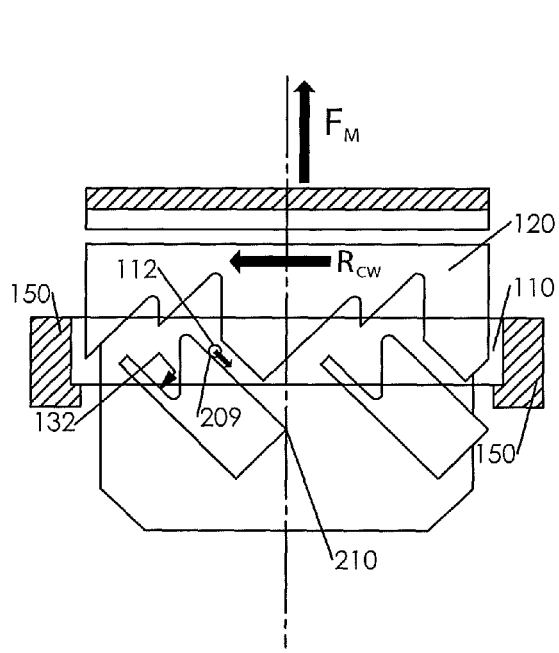

FIG. 2K shows the male latch member 120 withdrawn from the female latch member 110 so that the first pin 112 is at the point 209 on the second irregular surface 132. Continued withdrawal of the male latch member 120 by upward force $F_M$ causes the male latch member 120 to rotate clockwise $R_{CW}$ as the first pin 112 proceeds toward a point 210 on the second irregular surface 132.

Figure 2L:
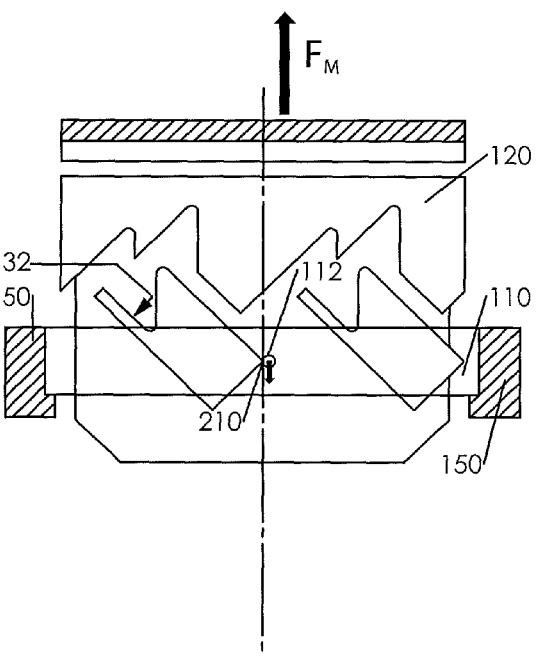

FIG. 2L shows the male latch member 120 withdrawn sufficiently from the female latch member 110 that the first pin 112 is at the point 210 on the second irregular surface 132. Continued withdrawal of the male latch member 120 causes the male latch member 120 to separate completely from the female latch member 110.

Figure 2M:
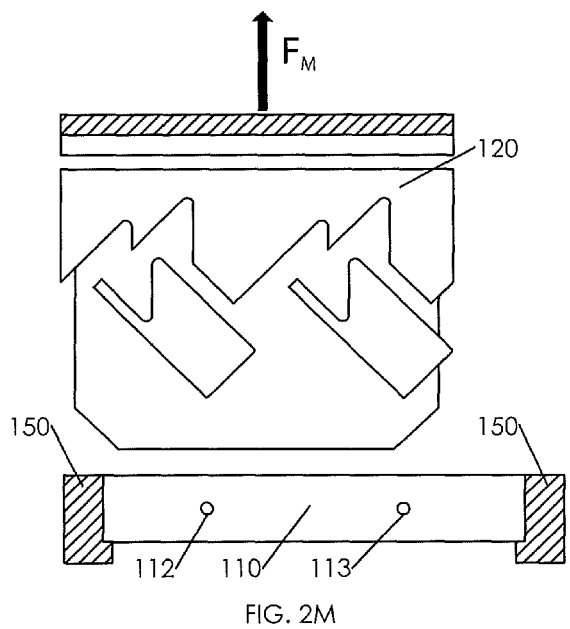

FIG. 2M shows the male latch member 120 completely withdrawn from the female latch member 110.

Figure 2N:
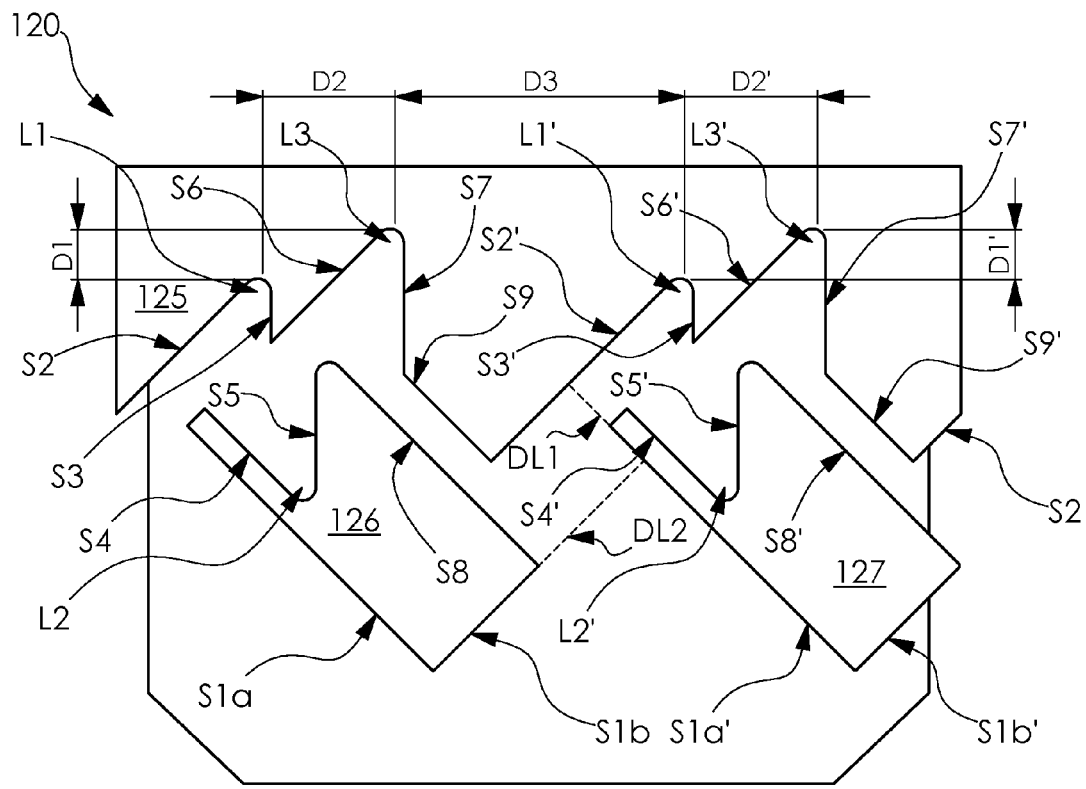
FIGS. 2N and 2P is a sectional view of the male latch member 120 of FIGS. 2A-2M.
Figure 2P:
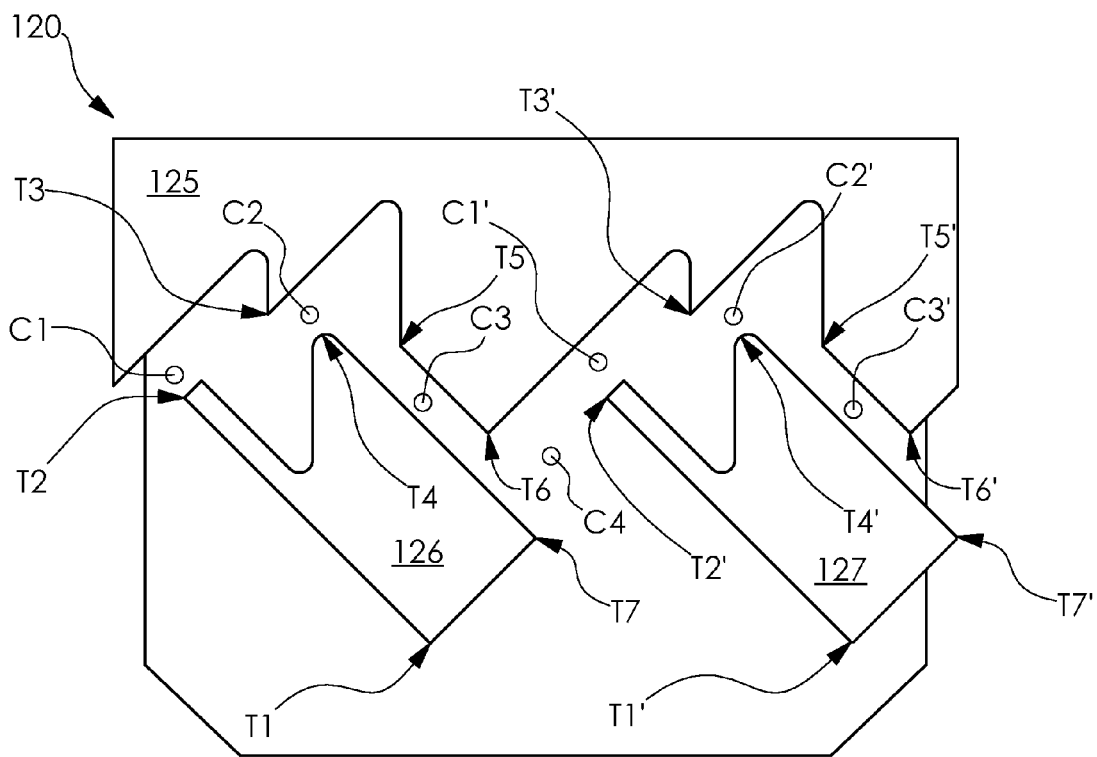

Turning now to FIGS. 2N and 2P, illustrated is a sectional view of the male latch member 120 of FIGS. 2A-2M. FIG. 2N illustrates the various different surfaces (e.g., illustrated with the letter S) and vertical limits (e.g., illustrated with the letter L) of the male latch member 120, and FIG. 2P illustrates the various different transition points (e.g., illustrated with the letter T) and channels (e.g., illustrated with the letter C) of the male latch member 120.

FIGS. 2N and 2P, and the surfaces, vertical limits, transition points, and channels, will be used to further discuss the path that a pin might travel as a male latch member and female latch member would engage and disengage one another. Similarly, the surfaces, vertical limits, transition points, and channels of different paths a pin might take may be delineated from one another by using a combination of letters and numbers (e.g., S1a, T1, C1, T1), a combination of letters and numbers with a single prime symbol (e.g., S1a', T1', C1', T1'), a combination of letters and numbers with a double prime symbol (e.g., S1a", T1", C1", T1"), etc. For example, in a three pin design, a first pin might follow a path delineated without any prime symbol, a second pin might follow a path delineated with a single prime symbol, and a third pin might follow a path delineated with a double prime symbol. Traditionally, the different paths of a given design are substantially identical, if not entirely identical, to one another.

For the purpose of the following discussion, it will be assumed that the male latch member 120 is configured (e.g., allowed) to rotate clockwise and counter-clockwise (e.g., with respect to the female latch member) as may be necessary to operate. In an alternative embodiment, the female latch member might be configured (e.g., allowed) to rotate clockwise and counter-clockwise (e.g., with respect to male latch member) as may be necessary to operate. In yet another embodiment, each of the male latch member and female latch member may be configured (e.g., allowed) to rotate freely with respect to each other.

It should be noted that while the embodiment of FIGS. 2N and 2P illustrate the male latch member 120 having the channels that the pin from the female latch member would engage, the same theory could apply if the female latch member were to have the channels that the pin from the male latch member would engage. Accordingly, the present disclosure should not be limited to one design or the other.

In operation, a pin would typically encounter the second portion 126 either to the left or right of the transition point T1. If the pin were to encounter the upwardly slanting surface S1$a$ of the second portion 126, it would cause the male latch member 120 to rotate counter-clockwise (when viewed from above) and thus the pin would slide upwards until it reaches the transition point T2. After reaching the transition point T2, the pin would travel upward to encounter the upwardly slanting surface S2 of the first portion 125. The upwardly slanting surface S2, in the embodiment shown, slants in an opposite direction as the upwardly slanting surface S1$a$. When the pin encounters the upwardly slanting surface S2, it causes the male latch member 120 to rotate clockwise (when viewed from above) and thus the pin would travel through the channel C1 and slide upwards until it reaches the vertical upper limit L1. Thus far, the pin has traveled to the vertical upper limit L1 by way of a relative downward force (e.g., an intentional force, gravitational force, etc.) upon the male latch member 120. The term "relative" is used in this instance as the force might be placed upon the male latch member, female latch member, or both of the male latch member and female latch member.

At this point, the pin is locked in the vertical upper limit L1 position until the relative downward force subsides. Exchanging the downward force for an upward force, the pin would travel down the surface S3 (e.g., substantially vertical surface S3 in one embodiment) to the transition point T3. At the transition point T3, the pin would head toward the downwardly slanting surface S4 of the second portion 126. As the pin encounters the downwardly slanting surface S4, it would cause the male latch member 120 to rotate clockwise (when viewed from above) and thus the pin would slide downward until it reaches the vertical lower limit L2. At this point, the female latch member 110, as well as anything attached to it, could be picked up by way of the pin being held in the vertical lower limit L2. This would be considered the "pick" of the "pick and place" process.

The pin may be released from the vertical lower limit L2 of the male latch member 120 by putting relative downward force (e.g., an intentional force, gravitational force, etc.) upon the male latch member 120. As downward force is applied to the male latch member 120, the pin travels up the upward slanting surface S5 (e.g., substantially vertical upward slanting surface S5 in one embodiment) until it encounters the transition point T4. After reaching the transition point T4, the pin would travel upward through the channel C2 to encounter the upwardly slanting surface S6 of the first portion 125. The upwardly slanting surface S6, in the embodiment shown, slants in an opposite direction as the upwardly slanting surface S1A, and in the same direction as the upwardly slanting surface S2. In the embodiment shown, the upwardly slanting surface S2 and upwardly slanting surface S6 are substantially, if not completely, parallel with one another. When the pin encounters the upwardly slanting surface S6, it causes the male latch member 120 to rotate clockwise (when viewed from above) and thus the pin would slide upwards until it reaches the vertical upper limit L3.

At this point, the pin is locked in the vertical upper limit L3 position until the relative downward force subsides. Exchanging the downward force for an upward force, the pin would travel down the surface S7 (e.g., substantially vertical surface S7 in one embodiment) to the transition point T5. At the transition point T5, the pin would head through the channel C3 toward the downwardly slanting surface S8 of the second portion 126. As the pin encounters the downwardly slanting surface S8, it would cause the male latch member 120 to rotate clockwise (when viewed from above) and thus the pin would slide downward past the transition point T6 until it reaches the transition point T7. When the pin reaches the transition point T7, the female latch member 110, as well as anything attached to it, would disengage from the male latch member 120. This would be considered the "place" of the "pick and place" process.

In contrast, to that described above, the pin might first encounter the upwardly slanting surface S1$b$ of the second portion 126, which would cause it to take an entirely different path. For example, if the pin were to encounter the upwardly slanting surface S1$b$, it would cause the male latch member 120 to rotate clockwise (when viewed from above) and thus the pin would slide upwards until it reaches the transition point T7. After reaching the transition point T6, the pin would travel upward through the channel C4 to encounter the upwardly slanting surface S2' of the first portion 125. The upwardly slanting surface S2', in the embodiment shown, slants in the same direction as the upwardly slanting surface S1$b$. When the pin encounters the upwardly slanting surface S2', it causes the male latch member 120 to rotate clockwise (when viewed from above) and thus the pin would slide upwards until it reaches the vertical upper limit L1'. Thus far, the pin has traveled to the vertical upper limit L1' by way of a relative downward force (e.g., an intentional force, gravitational force, etc.) upon the male latch member 120.

At this point, the pin is locked in the vertical upper limit L1' position until the relative downward force subsides. Exchanging the downward force for an upward force, the pin would travel down the surface S3' (e.g., substantially vertical surface S3 in one embodiment) to the transition point T3'. At the transition point T3', the pin would head toward the downwardly slanting surface S4' of the third portion 127. As the pin encounters the downwardly slanting surface S4', it would cause the male latch member 120 to rotate clockwise (when viewed from above) and thus the pin would slide downward until it reaches the vertical lower limit L2'. At this point, the female latch member 110, as well as anything attached to it, could be picked up by way of the pin being held in the vertical lower limit L2'. This would again be considered the "pick" of the "pick and place" process.

The pin may be released from the vertical lower limit L2' of the male latch member 120 by putting relative downward force (e.g., an intentional force, gravitational force, etc.) upon the male latch member 120. As downward force is applied to the male latch member 120, the pin travels up the upward slanting surface S5' (e.g., substantially vertical upward slanting surface S5 in one embodiment) until it encounters the transition point T4'. After reaching the transition point T4', the pin would travel upward through the channel C2' to encounter the upwardly slanting surface S6' of the first portion 125. The upwardly slanting surface S6', in the embodiment shown, slants in the same direction as the upwardly slanting surface S1$b$ and upwardly slanting surface S2'. When the pin encounters the upwardly slanting surface S6', it causes the male latch member 120 to rotate clockwise (when viewed from above) and thus the pin would slide upwards until it reaches the vertical upper limit L3'.

At this point, the pin is locked in the vertical upper limit L3' position until the relative downward force subsides. Exchanging the downward force for an upward force, the pin would travel down the surface S7' (e.g., substantially vertical surface S7 in one embodiment) to the transition point T5'. At the transition point T5', the pin would head through the channel C3' toward the downwardly slanting surface S8' of the second portion 126. As the pin encounters the downwardly slanting surface S8', it would cause the male latch member 120 to rotate clockwise (when viewed from above) and thus the pin would slide downward past the transition point T6' until it reaches the transition point T7'. When the pin reaches the transition point T7', the female latch member 110, as well as anything attached to it, would disengage from the male latch member 120. This would again be considered the "place" of the "pick and place" process.

As noted in FIGS. 2N and 2P, in one embodiment of the disclosure, if a line along S1a' is extended (e.g., as shown by the dotted line DL1) it intersects the upwardly slanting surface S2', as opposed to the channel C3 of the other pin path. Said another way, in the embodiment shown, the dotted line DL1 intersects the upwardly slanting surface S2' above the transition point T6. This dotted line DL1 indicates the likely path of travel for a given pin. This is designed to assure that a given pin, when travelling along the dotted line DL1, will not engage the wrong channel (e.g., in this instance channel C3). Similarly, if a line along S1b is extended (e.g., as shown by the dotted line DL2) it, in one embodiment, would intersect the upwardly slanting surface S1a', as opposed to a substantially vertical surface. This is designed to assure that a given pin will not bounce back off of the surface S1a' into the channel C3, as opposed to ultimately the desired channel C1'.

As further noted in FIGS. 2N and 2P, in one embodiment of the disclosure, the vertical upper limit L3 is vertically higher (e.g., by a distance (D1)) than the vertical upper limit L1, and the vertical upper limit L3' is vertically higher (e.g., by a distance (D1')) than the vertical upper limit L1'. In this embodiment, distance D1 and D1' are substantially identical. Similarly, in the embodiment shown, the vertical upper limit L1 is horizontally spaced from the vertical upper limit L3 by a distance D2, and the vertical upper limit L1' is horizontally spaced from the vertical upper limit L3' by a distance D2'. In this embodiment, distance D2 and D2' are substantially identical. Unique to at least one embodiment of the present design, a horizontal distance D3 separating the vertical upper limit L3 and the vertical upper limit L1' is different from the distances D2 or D2'. In one embodiment, the distance D3 is greater than each of the distances D2 or D2'. Such a spacing is designed to allow the dotted line DL1 to intersect the upwardly slanting surface S2', as opposed to the channel C3 of the other pin path, and therefore reduce the likelihood of a given pin engaging the wrong channel.

One who is of skill in the art will recognize that the pins may also be located on a male member while the first, second and third portions may be located on a female member. Such a configuration will now be discussed.

Figure 3A:
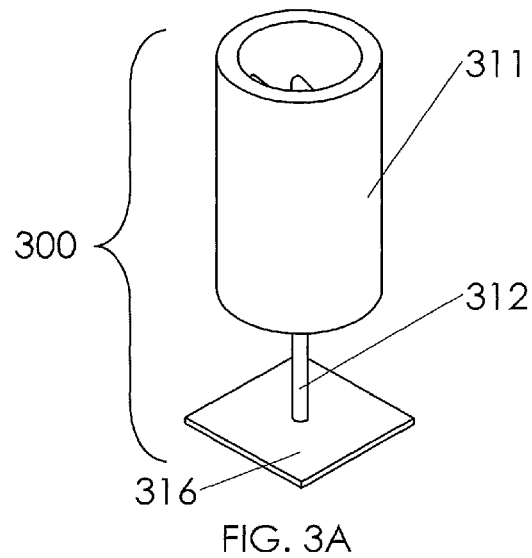
FIG. 3A is a perspective view of one embodiment of a pick-and-place system constructed according to the principles of the present disclosure.
Figure 3B:
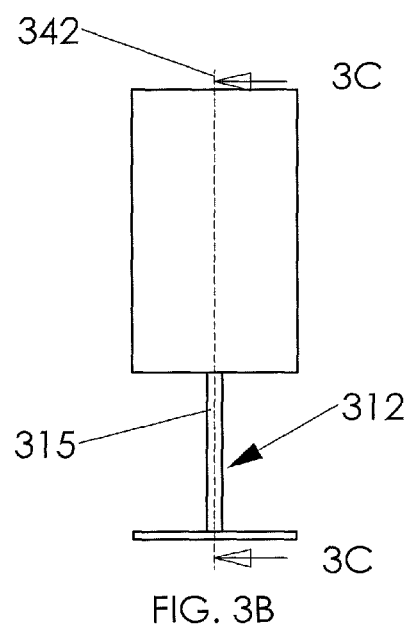
FIG. 3B is an elevation view of the pick-and-place device of FIG. 3A.

Referring now to FIG. 3A illustrated is a perspective view of one embodiment of a pick-and-place system 300 constructed according to the principles of the present disclosure. The pick-and-place system 300 comprises a first latch member 311 and a second latch member 312. In this embodiment, the first latch member 311 is a female latch member 311 having a central axis 313. The second latch member 312 is a male latch member 312 having a core 315 coincident with the central axis 313 and a base 316. FIG. 3B is an elevation view of the pick-and-place device 300 of FIG. 3A.

Figure 3C:
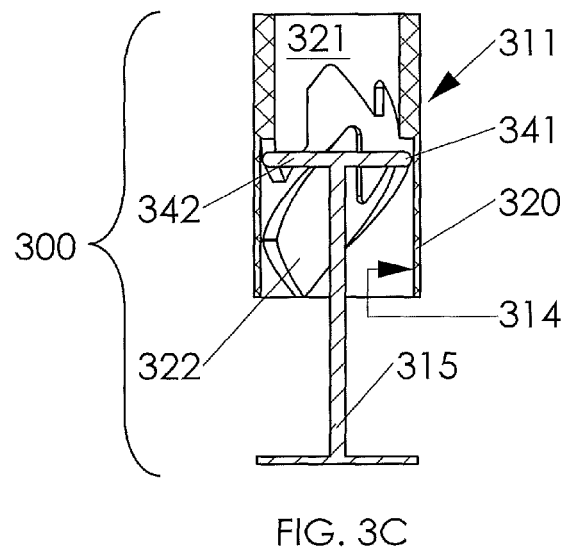
FIG. 3C is a sectional view of the pick-and-place system of FIG. 3A along plane 3C-3C.

Referring now to FIG. 3C with continuing reference to FIG. 1, illustrated is a sectional view of the pick-and-place system 300 along plane 3C-3C. The female latch member 311 comprises a hollow cylinder 320 having an internal surface 314 parallel to the central axis 313 and upon which first, second and third portions 321-323 (third portion 323 not visible), respectively, are formed. The first, second and third portions 321-323, respectively, are analogous to the first, second and third portions 125-127, respectively of FIG. 1. The male latch member 312 further comprises first and second pins 341, 342, respectively, coupled to an end of the core 315 and extending radially therefrom. While the core 315 is shown as relatively thin, an alternative embodiment is envisioned to have a core that substantially fills the lower cavity of the female latch member 311 with the first and second pins 341, 342, respectively, extending radially therefrom. One who is of skill in the art will realize that the base 316 does not need to be a rectangular plate as shown, but can be any configuration that will readily couple to a workpiece. In the present embodiment, the female latch member 312 reciprocates vertically to temporarily latch with the male latch member 311. Of course, the relative positions of the female and male members 311, 312 can be swapped so that the female member 311 is coupled to the workpiece and the male member 312 performs the latching/unlatching function. The operation of the pick-and-place system 300 is essentially the same as the rotating tension latch 100 of FIG. 1.

One or both latch members could contain sensors 160 to assist a control system or user in recognizing the pin or pins' relative position within the channel. For example, in FIG. 2E, when the pin 112 reaches the secure position 204, it could signal the user or automated control system by completing a circuit, touching a contact switch, or otherwise. One skilled in the art will recognize that such a sensor 160 can be placed to sense the position of the pin at any point in the channel.

It should also be noted that one or both latch members could contain sensors to assist a control system or user in aligning the two parts concentrically before latching. For example, in FIG. 1, an optical sensor could be placed at the tip of the cone 128 to sense a mark or light emitter in the center of the female member. Similarly, in the embodiment shown in FIG. 3A, the sensor could be placed within the female latching member 311 or it's actuator (not shown), and the target mark or light emitter could be placed on the male pins 312. Strategically placed magnets 170 could be used to sense or even assist alignment of the two members.

Thus, a rotating tension latch and a pick-and-place system have been described wherein vertical motion of the one latch member relative to the complementary latch member latches and unlatches the two members. Clockwise or counterclockwise rotation of one latch member is automatically accomplished as the first latch member engages or disengages from the second latch member. One of skill in the pertinent art will readily understand that the roles of the male and female latch members as described may be reversed, i.e., the male latch member may be affixed to a workpiece or other apparatus, and the female latch member may be used to engage and disengage the male latch member.

Tension in the present disclosure is defined as the resistance of one latch member, e.g., female latch member 110, to motion when a vertical upward force is applied to the complementary latch member, e.g., male latch member 120. The use of such terms as providing, forming, etc., as used herein includes: manufacturing, milling, casting, contracting, purchasing, etc. Those skilled in the art to which this application relates will appreciate that other and further additions, deletions, substitutions and modifications may be made to the described embodiments.

What is claimed is:

1. A female latch member, comprising:
an aperture having a central axis and a cylindrical inside surface;
a first upper wall portion and circumferentially-spaced second, third and fourth lower wall portions extending radially from said inside surface, guide and limit surfaces of each lower wall portion facing respective guide and limit surfaces of the upper wall portion to form first, second and third channels, said first, second and third channels being substantially identically shaped and evenly distributed by about 120 degrees, each of said first, second and third channels having in order a first vertical upper limit defined between a respective upwardly-sloping guide surface and a first limit surface of the upper wall portion, a second vertical lower limit defined between a downwardly-sloping guide surface and a second limit surface of a respective lower wall portion, and a third vertical upper limit defined between a respective upwardly-sloping guide surface and a third limit surface of the upper wall portion, and further wherein a horizontal distance (D2) between the first vertical upper limit and the third vertical upper limit for a given channel is different from a horizontal distance (D3) between the third vertical upper limit of one channel and a nearest first upper vertical upper limit of an adjacent channel, said first, second and third channels configured to receive three related pins of a male latch member and cause said female latch member to rotate relative to said male latch member and to alternate between latched and unlatched configurations as said female latch member reciprocates along said central axis relative to said male latch member, said female latch member and said male latch member temporarily engaging one another when latched; and
one or more electronic or optical sensors associated with at least one of said first, second or third channels, the one or more sensors configured to assist in recognizing positions of said first, second or third vertical limits relative to at least one of said three related pins.

2. The female latch member as recited in claim 1 wherein said female latch member is configured to be driven to reciprocate.

3. The female latch member as recited in claim 1 wherein said female latch member is configured to be driven to reciprocate by gravity.

4. The female latch member as recited in claim 3 wherein non-tight tool tolerances between said female latch member and said male latch member allow said female latch member to be driven to reciprocate by said gravity.

5. The female latch member as recited in claim 1 further including strategically placed magnets configured to assist in an alignment of said female latch member with said male latch member.

6. The female latch member as recited in claim 1 further including a flexible attachment coupled to said female latch member for advancing said female latch member toward said male latch member.

7. A male latch member, comprising:
a core having a central axis and a cylindrical outside surface;
a first upper wall portion and circumferentially-spaced second, third and fourth lower wall portions radially extending from said outside surface, guide and limit surfaces of each lower wall portion facing respective guide and limit surfaces of the upper wall portion to form first, second and third channels, said first, second and third channels being substantially identically shaped and evenly distributed by about 120 degrees around said core, each of said first, second and third channels having in order a first vertical upper limit defined between a respective upwardly-sloping guide surface and a first limit surface of the upper wall portion, a second vertical lower limit defined between a downwardly-sloping guide surface and a second limit surface of a respective lower wall portion, and a third vertical upper limit defined between a respective upwardly-sloping guide surface and a third limit surface of the upper wall portion, and further wherein a horizontal distance (D2) between the first vertical upper limit and the third vertical upper limit for a given channel is different from a horizontal distance (D3) between the third vertical upper limit of one channel and a nearest first upper vertical upper limit of an adjacent channel, said first, second and third channels configured to receive three related pins of a female latch member and cause said male latch member to rotate relative to said female latch member and to alternate between latched and unlatched configurations as said male latch member reciprocates along said central axis relative to said female latch member, said male latch member and said female latch member temporarily engaging one another when latched; and
one or more electronic or optical sensors associated with at least one of said first, second or third channels, the one or more sensors configured to assist in recognizing positions of said first, second or third vertical limits relative to at least one of said three related pins.

8. The male latch member as recited in claim 7 wherein said male latch member is configured to be driven to reciprocate.

9. The male latch member as recited in claim 7 wherein said male latch member is configured to be driven to reciprocate by gravity.

10. The male latch member as recited in claim 7 wherein said core includes a chamfered end configured to guide said core into an aperture in said female latch member.

11. A pick-and-place system, comprising:
a first latch member having a central axis and a cylindrical surface surrounding said central axis;
a second latch member; and
a first upper wall portion and circumferentially-spaced second, third and fourth lower wall portions extending radially from said surface, guide and limit surfaces of each lower wall portion facing respective guide and limit surfaces of the upper wall portion to form first, second and third channels, said first, second and third channels being substantially identically shaped and evenly distributed by about 120 degrees, each of said first, second and third channels having in order a first vertical upper limit defined between a respective upwardly-sloping guide surface and a first limit surface of the upper wall portion, a second vertical lower limit defined between a downwardly-sloping guide surface and a second limit surface of a respective lower wall portion, and a third vertical upper limit defined between a respective upwardly-sloping guide surface and a third limit surface of the upper wall portion, and further wherein a horizontal distance (D2) between the first vertical upper limit and the third vertical upper limit for a given channel is different from a horizontal distance (D3) between the third vertical upper limit of one channel and a nearest first upper vertical upper limit of an adjacent channel, said first, second and third channels configured to receive three related pins of said second latch member and cause said first latch member to rotate relative to said second latch member, wherein said first and second latch members alternate between latched and unlatched configurations as said first latch member reciprocates along said central axis relative to said second latch member, said first latch member and said second latch member temporarily engaging one another when latched; and one or more electronic or optical sensors associated with at least one of said first, second or third channels, the one or more sensors configured to assist in recognizing positions of said first, second or third vertical limits relative to at least one of said three related pins.

12. The pick-and-place system as recited in claim 11 wherein said first latch member is a female latch member and said second latch member is a male latch member.

13. The pick-and-place system as recited in claim 12 wherein said three related pins extend radially outward from said male latch member.

14. The pick-and-place system as recited in claim 12 wherein said surface is parallel to said central axis.

15. The pick-and-place system as recited in claim 11 wherein said first latch member is a male latch member and said second latch member is a female latch member.

16. The pick-and-place system as recited in claim 15 wherein said first and second wall portions extend radially outward from said surface.

17. The pick-and-place system as recited in claim 15 wherein said pin extends radially inward from said female latch member.

18. The pick-and-place system as recited in claim 11 further including strategically placed magnets configured to assist in an alignment of said first latch member with said second latch member.

19. The pick-and-place system as recited in claim 11 wherein non-tight tool tolerances between said first latch member and said second latch member allow said first latch member to be driven to reciprocate by gravity.

20. The pick-and-place system as recited in claim 11 further including a flexible attachment coupled to said first latch member for advancing said first latch member toward said second latch member.

21. The pick-and-place system as recited in claim 11 wherein for each channel the first vertical upper limit and the third vertical upper limit are vertically separated by a vertical distance (D1).

22. The pick-and-place system as recited in claim 21 wherein for each channel the third vertical upper limit is vertically higher than the first vertical upper limit by the vertical distance (D1).

* * * * *